United States Patent
Marcelissen

[19]
[11] Patent Number: 5,942,020
[45] Date of Patent: *Aug. 24, 1999

[54] APPARATUS FOR EVACUATING AIR FROM CURING AREA OF UV LAMPS FOR FIBER-LIKE SUBSTRATES

[75] Inventor: John T. Marcelissen, Pierrefonds, Canada

[73] Assignee: Tensor Machinery Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/868,242

[22] Filed: Jun. 3, 1997

Related U.S. Application Data

[63] Continuation of application No. 08/584,841, Jan. 11, 1996, abandoned.

[51] Int. Cl.[6] ................................................. C03B 37/027
[52] U.S. Cl. .............................. 65/530; 65/432; 118/753; 261/DIG. 56
[58] Field of Search .......................... 65/430, 432, 530; 118/733; 261/DIG. 56

[56] References Cited

U.S. PATENT DOCUMENTS

| | | |
|---|---|---|
| 2,424,654 | 7/1947 | Gamble . |
| 2,853,970 | 9/1958 | Novak ..................................... 118/733 |
| 3,865,074 | 2/1975 | Cornelissen .............................. 118/733 |
| 4,096,823 | 6/1978 | Schladitz ................................. 118/733 |
| 4,113,438 | 9/1978 | Brooks . |
| 4,209,472 | 6/1980 | Child . |
| 4,317,667 | 3/1982 | Spainhour ............................... 118/733 |
| 4,387,685 | 6/1983 | Abbey . |
| 4,575,463 | 3/1986 | Biswas ..................................... 65/432 |
| 5,062,687 | 11/1991 | Sapsford .................................. 65/432 |
| 5,079,045 | 1/1992 | Luhmann ................................ 118/733 |
| 5,242,477 | 9/1993 | Edmonston .............................. 65/432 |
| 5,281,247 | 1/1994 | Aikawa .................................... 65/430 |
| 5,352,292 | 10/1994 | Yang ....................................... 118/733 |

FOREIGN PATENT DOCUMENTS

| | | | |
|---|---|---|---|
| 4014329 | 11/1991 | Germany ................................ 65/530 |
| 53-125037 | 11/1978 | Japan ...................................... 65/432 |
| 63-307137 | 12/1988 | Japan ...................................... 65/530 |
| 2159812 | 12/1985 | United Kingdom ..................... 65/430 |

*Primary Examiner*—John Hoffmann
*Attorney, Agent, or Firm*—Schweitzer Cornman Gross & Bondell LLP

[57] ABSTRACT

The invention provides a device for blocking the ingress of air on the surface of a moving member such as an optical fiber. The blocking of air is achieved by the establishment of a low pressure zone at the entry point of the fiber, the lower pressure zone being created by the injection of an inert gas in a direction opposite the direction of travel of the fiber. The invention is particularly useful in preventing the ingress of air into a UV curing apparatus for curing the ink on an optical fiber. There is also provided a method for reducing such ingress of air.

5 Claims, 3 Drawing Sheets

APPARATUS FOR EVACUATING AIR FROM CURING AREA OF UV LAMPS FOR FIBER-LIKE SUBSTRATES

This application is a continuation of application Ser. No. 08/584,841, now abandoned:

FIELD OF THE INVENTION

The present invention relates to the art of coating fiber-like substrates, such as optic fibers. More particularly, the invention pertains to a method and apparatus for curing the coating material under a controlled atmosphere. The curing chamber features a gaseous seal capable of stripping away the layer of air adhering to the surface of the moving fiber as it enters the curing chamber.

BACKGROUND OF THE INVENTION

Optical fiber cables that are commonly used for telecommunication purposes are comprised of a large number of fiber strands, each strand providing an independent optical pathway. The individual strands of the cable are color-coated to facilitate identification. Thus, one strand is colored blue, another one red, and so on, in much the same way as insulated sheath of conventional copper conductors are color-marked for quick visual identification.

The color-coating process consists of depositing on the fiber strand a suitable ink that is subsequently cured under the effect of ultra-violet (UV) radiation. The ink coating and curing are performed as a continuous process. The strand is drawn at high speed, in the range of up to 1000 meters per minute through an ink bath designed to deposit a uniform layer of ink material on the surface of the strand. Immediately thereafter, the stand enters the curing chamber where it is subjected to a dose of UV radiation sufficient to cure the coating.

It is well-recognized in the art that the curing process should be performed in an atmosphere substantially free of oxygen to avoid oxidation problems of the ink and/or the glass substrate that may affect the durability of the fiber. Typically, the oxygen content in the curing chamber is controlled by injection of suitable inert gas, such as nitrogen. This technique, however, has not been particularly successful in reducing the oxygen content of the curing chamber to safe levels. This is due to the air pumping action that is generated by the fiber as it moves at high speed through the chamber. Indeed, as the fiber moves through the air, before entering the curing chamber a very thin layer of air adheres to its surface and moves at about the same linear speed as the strand. Thus, when the strand enters the curing chamber, an appreciable quantity of air is entrained with it and contaminates the curing zone.

OBJECTS AND STATEMENT OF THE INVENTION

An object of the present invention is a gaseous seal device for a fiber-like substrate with the capability of substantially reducing air entrainment.

Another object is a curing chamber utilising the aforementioned gaseous seal device.

Yet another object of the invention is a method for sealing a moving fiber-like member.

SUMMARY OF THE INVENTION

As embodied and broadly described herein, the invention provides a gaseous seal device for air entrained on a surface of a moving fiber-like member, said gaseous seal device comprising:

a main body;

a passage in said main body to allow the fiber-like member to pass through said main body;

means for establishing a low pressure zone in a vicinity of said passage to form an obstacle to the ingress of air entrained on the surface of the fiber-like member in said passage.

As embodied and broadly described herein, the invention provides a method for reducing the ingress of air entrained on the surface of a moving fiber-like body, said method comprising the step of establishing a low pressure zone around an entry point of the fiber-like body.

DESCRIPTION OF A PREFERRED EMBODIMENT

Figure 1:
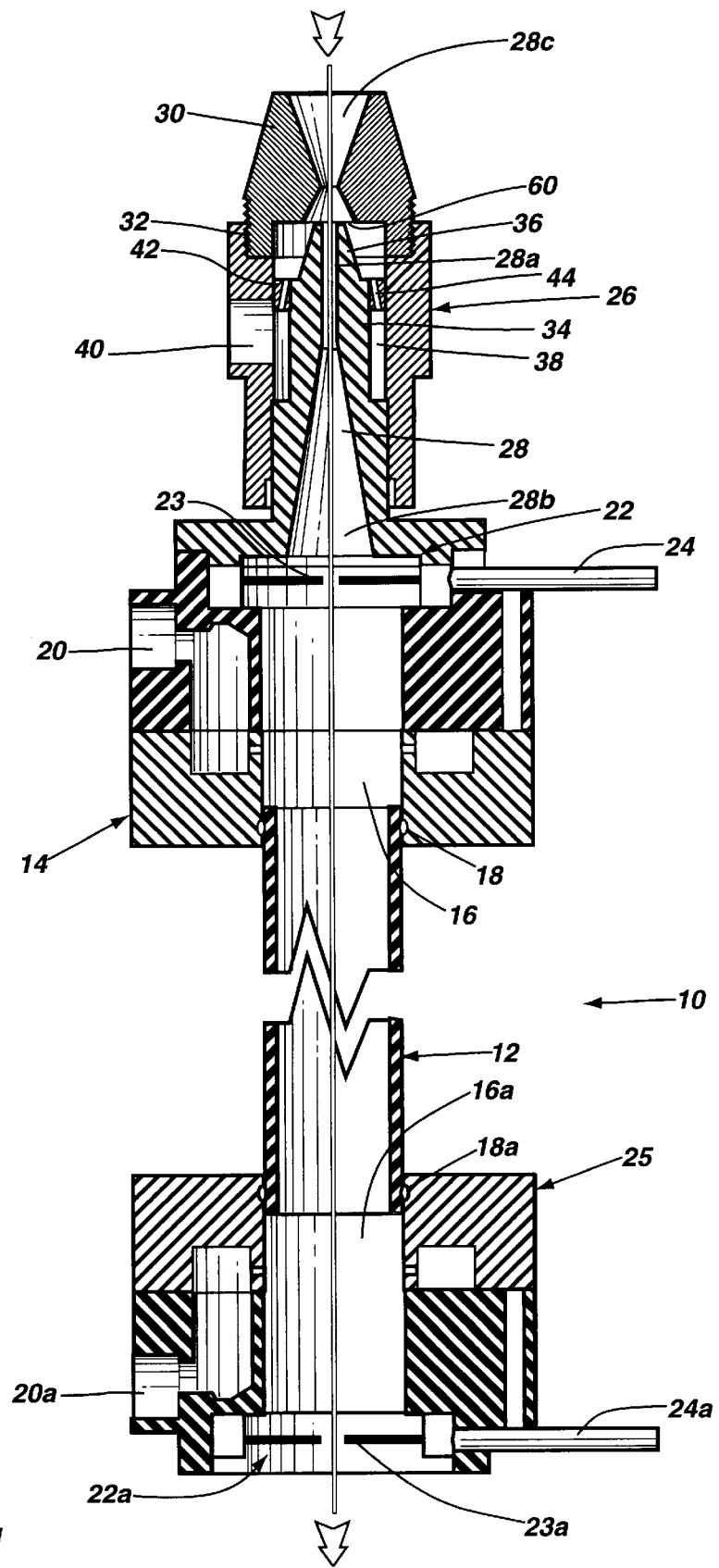
FIG. 1 is an enlarged vertical cross-sectional view of the curing chamber illustrating the flow path of nitrogen that substantially blocks the entrainment of air in the curing zone.

The curing chamber in accordance with the invention is intended to be used in an installation for manufacturing optical fiber cables that are comprised of one or several individual optic strands. Typically, the curing chamber is installed near the end of the coloring line section to cure an ink coating deposited on a fiber strand.

The curing chamber is designated comprehensively by the reference numeral 10 and comprises a quartz tube 12 having a length in the range from 150 to 1000 millimeters depending upon the intended application. The purpose of the quartz tube 12 is to create a UV transparent barrier zone to allow UV radiation originating from an external source to penetrate the curing zone while preventing ingress of air that could be detrimental to the cure quality.

The upper extremity of the quartz tube 12 is closed by an upper end block 14 which is in the form of a generally circular member with a centrally located bore 16 that receives the extremity of the quartz tube 12. An 0-ring 18 is mounted between the end block 14 and the quartz tube 12 to provide a sealing function.

The end block 14 is provided with an exhaust port 20 in fluid communication with the central bore 16 to bleed nitrogen gas injected in the quartz tube, as it will be described hereinafter. The end block 14 also comprises a variable aperture fiber inlet 22 through which the ink coated fiber is being admitted. The variable aperture system 22 includes an adjustable iris diaphragm 23 defining a central opening whose diameter can be varied continuously to adapt it to the diameter of the fiber. The degree of opening of the iris diaphragm 23 is controlled by a manually operated lever 24. The iris diaphragm 23 is designed primarily to form a static seal around the fiber and reduces as much as possible the gaseous exchange in and out of the curing zone.

The lower extremity of the quartz tube 12 is closed by an end block 25 which is similar in construction to the upper end block 14. For the purpose of convenience, the elements of the end block 25 that are similar to those of the end block 14 will be designated with the same reference numerals followed by the suffix "a". Note that the port 20a is used as a primary supply of nitrogen in the quartz tube contrary to the nitrogen bleed function of the sister port 20 of the end block 14.

On top of the end block 14 is mounted a gaseous seal device 26 designed to bathe the incoming fiber with nitrogen or any other suitable gas to strip away the layer of air leading to the surface of the moving fiber. The gaseous seal device 26 comprises a variable diameter central bore 28 that is generally co-axial with the quartz tube 12 and the bores 16, 16*a* of end blocks 14 and 25. The bore 28 comprises a central section 28*a* that is of a generally constant diameter merging with a flaring lower section 28*b*. The upper section 28*c* of the bore outwardly flares providing a venturi effect as it will be described hereinafter. The section 28*c* is formed on a cylindrical block 30 that is threadedly engaged at 32 with the main body of the gaseous seal device, for adjustability purposes.

The central section 28*a* is formed within a vertically extending tubular member 34 having a frusto-conical tip 36. The tubular member 34 is surrounded by an annular cavity 38. Nitrogen, or any other suitable inert gas, can be pumped in the annular cavity 38 through an inlet port 40. The flow of nitrogen gas injected in the annular cavity 38 is controlled by a circular plate 42 which sits below the frusto-conical tip 36 of the tubular member 34. The plate 42 is machined to tightly fit against the outer peripheral wall of the annular cavity 38 to prevent the escape of gas therebetweeen. Nitrogen is allowed to pass through six equispaced orifices 44 configured to create individual gas jets that are inclined to converge toward the venturi opening 28*c*. Note that the number of jets used may vary in accordance with the intended application.

Figure 2:
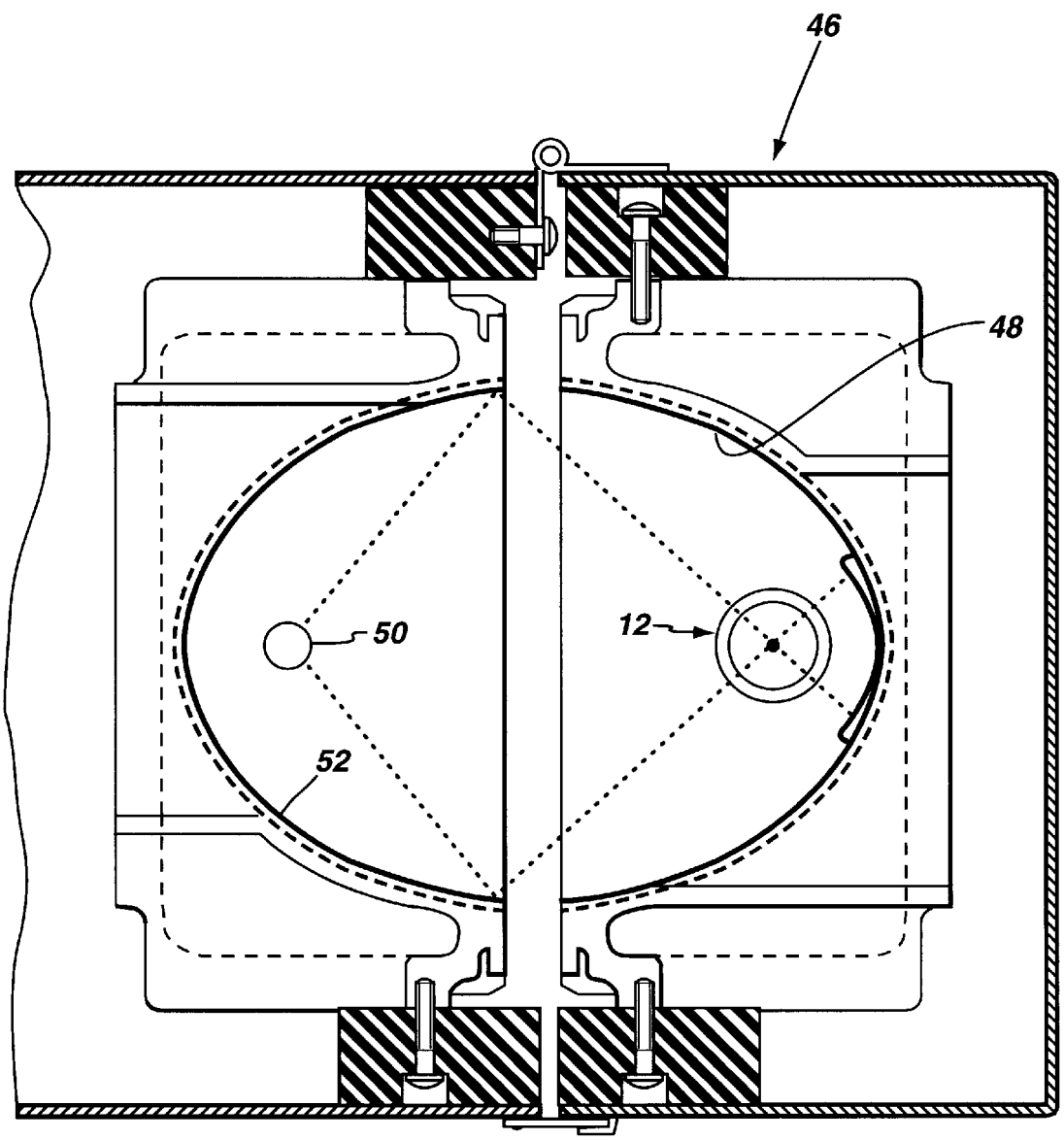
FIG. 2 is a horizontal cross-section of the curing chamber used in the coloring line of the present invention.
Figure 3:
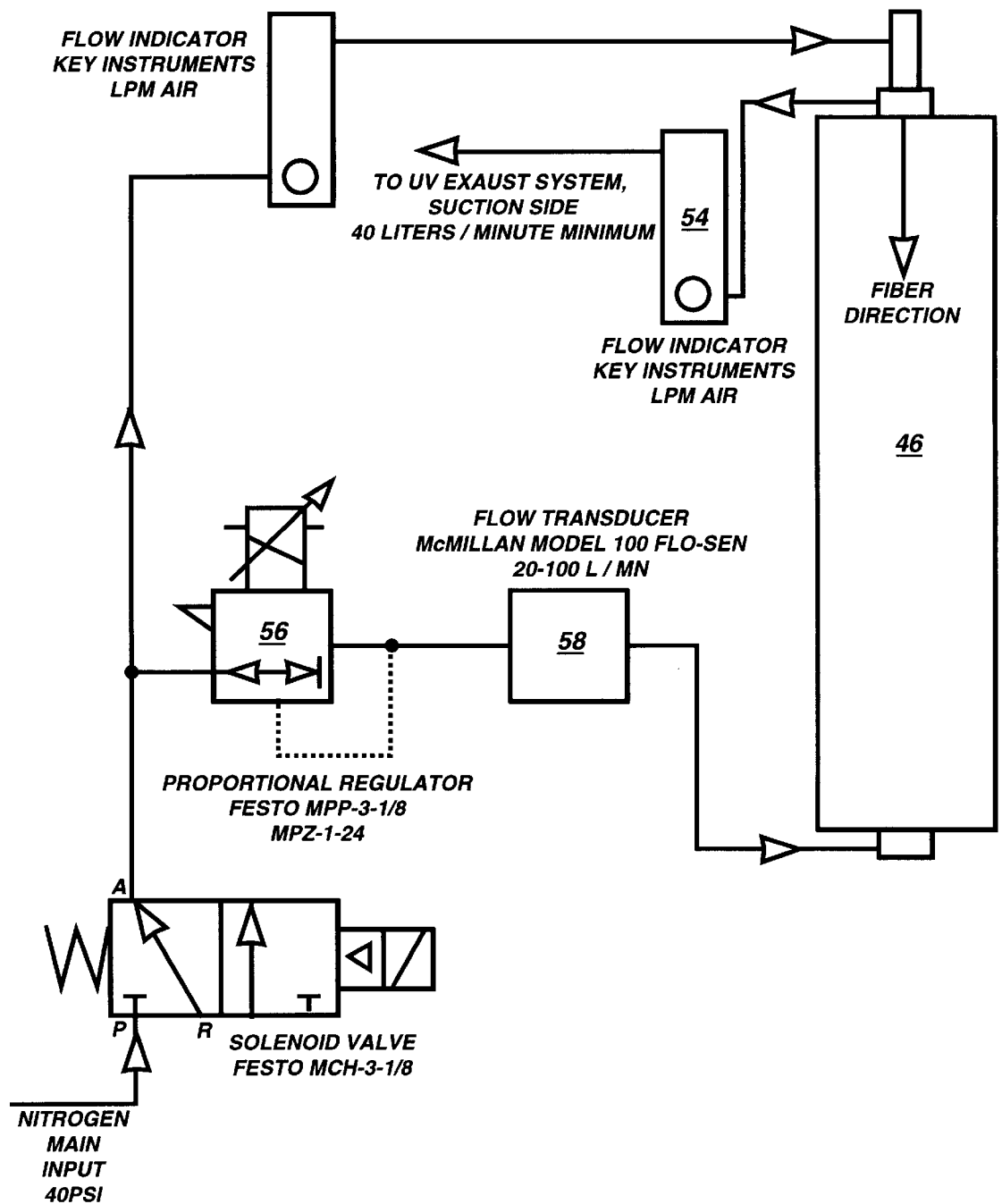
FIG. 3 is a schematic diagram of the apparatus for dynamically controlling the supply of nitrogen to the curing chamber.

The curing chamber as described above is used in the coloring line diagrammed in FIG. 3. The main component of the coloring line is an irradiator 46 in which is mounted the curing chamber 10. The irradiator 46 is best shown in FIG. 2. This component will not be described in detail because it is of a known construction and it does not form part of the invention. Suffice it to say that it defines an oval-shaped enclosure 48 receiving a source 50 of UV radiation. The reflective surfaces 52 are geometrically shaped and arranged for distributing evenly the UV radiation around the quartz tube 12 to uniformly cure the ink coating deposited on the optical fiber strand.

The optical fiber strand with the freshly deposited ink enters the curing chamber 10 through the venturi shaped section 28*c*. Since the fiber travels at a comparatively high speed, in the order of 1000 meters per minute, the laminar flow of air on the fiber strand surface tends to be entrained with the fiber which has the detrimental effect of raising the oxygen content of the curing chamber 10. To reduce this undesirable air pumping action, nitrogen is supplied to the inlet port 40 to form six converging gas jets emerging from the circular plate 42. The angle of the jets is such that they pass through the annular orifice 60 defined between the apex of the tubular member 34 and the base of the hourglass shaped venturi passage 28*c*. This annular passage is of reduced cross-sectional shape to increase the velocity of the gas at this point. As the gas emerges from the annular passage it expands in the higher void volume section 28*c*. This expansion creates a negative pressure zone which has a tendency to obstruct the laminar airflow from entering the central section 28*a*. The second beneficial effect of the air jets is to create a wiping action on the fiber by forcing turbulent air around the fiber surface, thus disrupting the laminar flow effect. This further reduces the amount of air pulled into the curing chamber.

The position of the cylindrical block 30 with relation to the main body of the gaseous seal device 26 can be adjusted by rotating the block 30 in the appropriate direction for controlling the dimension of the annular passage 60 and the base of the venturi passage 28*c* for in turn regulating the intensity of the negative pressure zone established around the optical fiber strand.

In a most preferred embodiment, nitrogen is supplied to the inlet port 40 at a pressure of about 10 PSI and at a flow rate in the range from about 5 meters per minute to about 30 meters per minute.

Once the fiber has passed through the gaseous seal device 26 it enters the curing region through the narrow aperture formed by the iris diaphragm 23. While travelling along the quartz tube 12, the fiber is subjected to UV radiation to cure the ink coating thereon. The cured fiber leaves the curing chamber through the iris 23*a* at the end block 25.

To maintain the atmosphere in the curing chamber as much oxygen free as possible, nitrogen gas is injected therein through the lower end of the block 25 to create a flow of gas that is countercurrent to the direction of travel of the fiber. Most preferably, nitrogen is delivered at a pressure of about 20 PSI at a flow rate in the range from about 20 liters per minute to about 100 liters per minute. This establishes a positive pressure zone in the curing chamber for preventing air to enter through the gap between the fiber and the adjustable iris diaphragm at the outlet end of the chamber. Nitrogen is bled from the end block 14 at a rate in the range from about 5 to about 30 liters per minute. The nitrogen is directed to a flow indicator 54 and it is then supplied to an oxygen analyzer (not shown in the drawings) to measure the actual oxygen content in the curing chamber. In response to the measurement supplied by the oxygen analyzer, the flow of nitrogen injected through the lower end block 26 can be controlled by a regulator 56 to correct oxygen content deviations. Flow rate readings are supplied to the control system through a transducer 58.

The curing system can thus be controlled by any suitable micro-processor based controller that reads the oxygen content in the curing chamber and then varies the amount of nitrogen gas injected to dynamically compensate for variations.

The above description of the invention should not be interpreted in a limiting manner as variations and refinements can be made without departing from the spirit of the invention. The scope of the invention is defined in the appended claims and their equivalents.

The Embodiments of the invention in which an exclusive property or privilege is claimed are defined as follows:

1. An ultraviolet lamp apparatus for curing the coating material on a filament, fiber, or thread, including a device adapted to remove a layer of atmospheric air adhering to the surface of said filament, fiber or thread prior to entering a curing chamber;

said device comprising a cylindrical block housing a central bore;

said central bore having an upper flared section and a lower venturi passage;

said central bore being adapted to receive in operation an incoming fiber, filament, or thread;

said device further including a vertically extending tubular member within said bore;

said member including a frustoconical upper tip, and being surrounded by an annular cavity;

said device further comprising a circular plate adapted to fit tightly against a peripheral wall of said annular cavity thus creating an upper annular cavity and a lower annular cavity;

said tubular member and said circular plate each including a coaxial central bore adapted to receive said incoming fiber, thread or filament;

said circular plate including a plurality of symmetrically positioned orifices therethrough; and whereby in operation, when an inert gas is supplied to said lower annular cavity, it passes upwardly through said orifices to said upper annular cavity in the form of a plurality of individual high pressure gas jets converging in said venturi passage and thereafter expanding in said upper flared portion, thereby creating a lower than atmospheric pressure zone around said incoming fiber thread or filament and a wiping action on the surface thereof, thereby reducing the amount of atmospheric air entering said curing chamber.

2. An apparatus as claimed in claim 1, wherein said cylindrical block threadingly engages said device:

whereby in operation, the size of said upper annular cavity can be reduced or increased by turning said block clockwise or counterclockwise respectively, thereby decreasing or increasing an outflow of said inert gas.

3. An apparatus as claim in claim 1, further comprising:

a pair of adjustable irises adapted in operation, to fit closely about said fiber, filament or thread in a pre-entry curing chamber location and a post-exit curing chamber location, thereby further reducing entry of atmospheric air into said curing chamber.

4. An apparatus as claimed in claim 1, wherein the number of orifices in said circular plate is six and said inert gas is nitrogen.

5. An apparatus as claimed in claim 1, wherein said inert gas is also supplied to said curing chamber;

such that in operation, the flow direction of said inert gas is countercurrent to the direction of said fiber, filament, or thread.

* * * * *